L. HILLAN.
SECURING DEVICE FOR WAGON END GATES.
APPLICATION FILED JUNE 22, 1909.
954,392.
Patented Apr. 5, 1910.
2 SHEETS—SHEET 1.
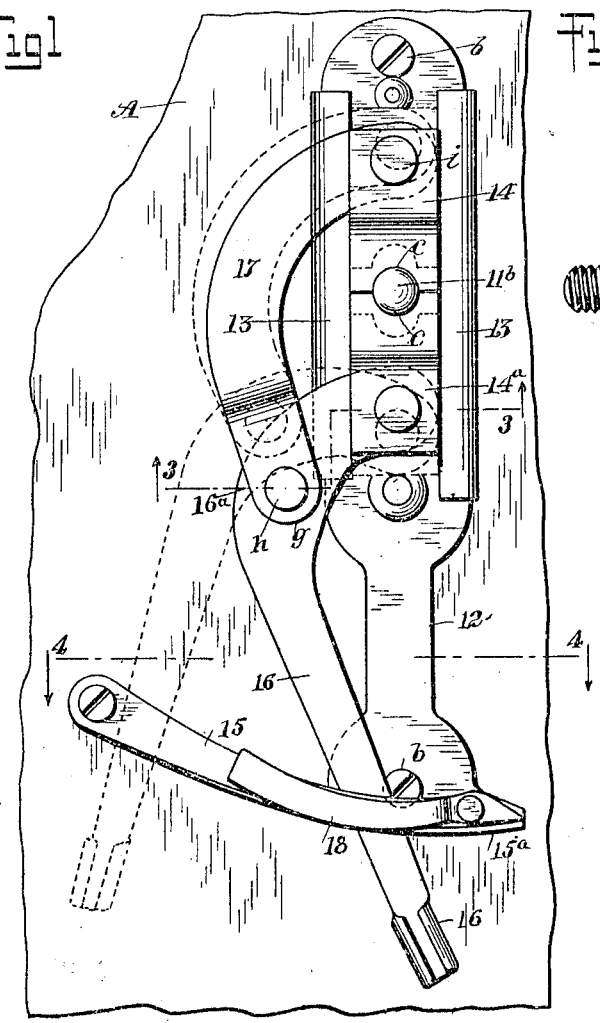
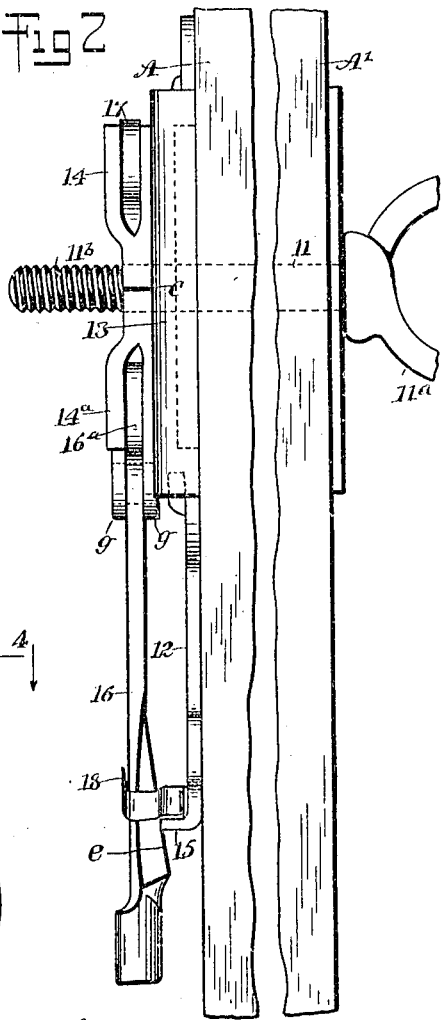
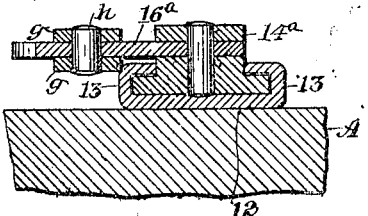
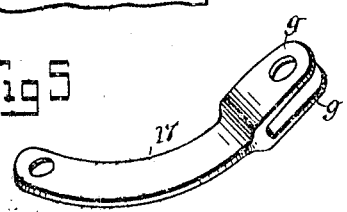
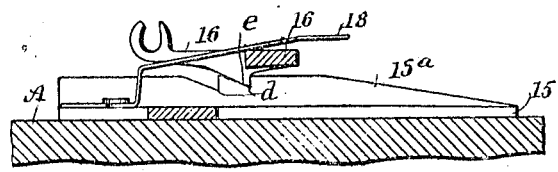
WITNESSES
C. J. Hachenberg
Wm. P. Patton
INVENTOR
Ludwig Hillan
BY Munn & Co.
ATTORNEYS

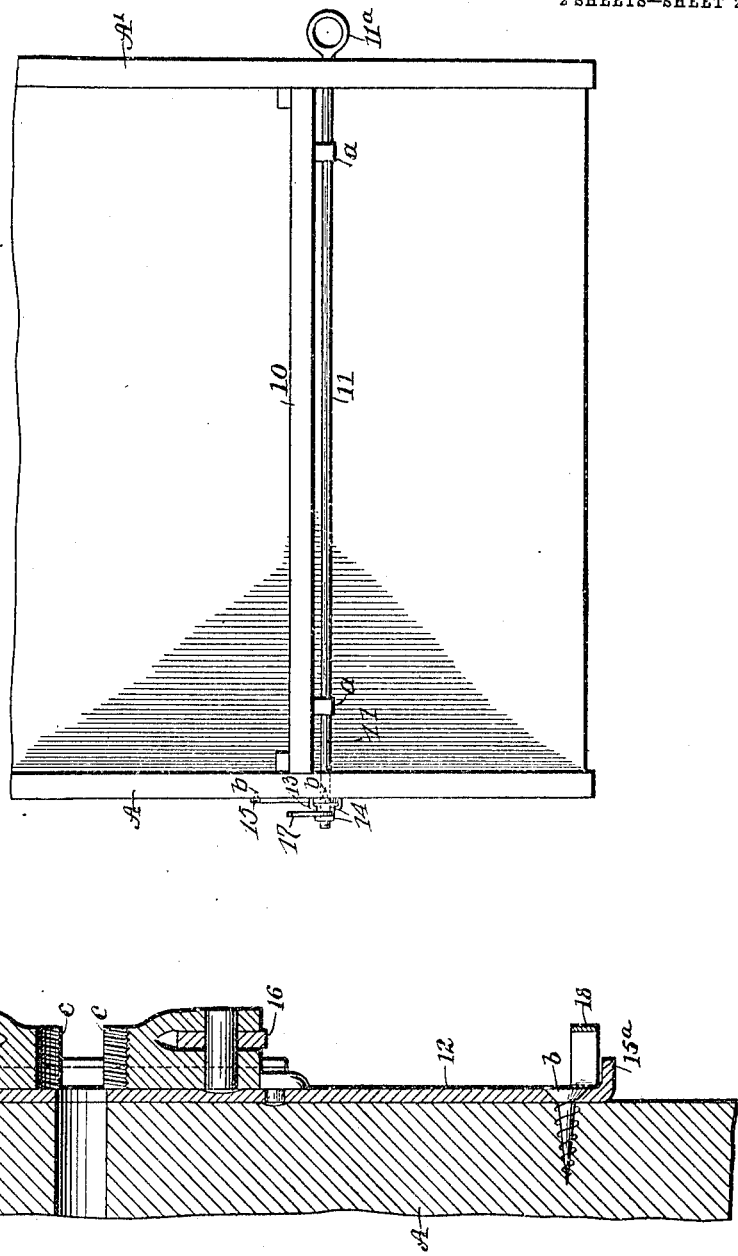

UNITED STATES PATENT OFFICE.

LUDWIG HILLAN, OF WENTWORTH, SOUTH DAKOTA.

SECURING DEVICE FOR WAGON END-GATES.

954,392.  Specification of Letters Patent.  Patented Apr. 5, 1910.

Application filed June 22, 1909. Serial No. 503,609.

*To all whom it may concern:*

Be it known that I, LUDWIG HILLAN, a citizen of the United States, and a resident of Wentworth, in the county of Lake and State of South Dakota, have invented a new and Improved Securing Device for Wagon End-Gates, of which the following is a full, clear, and exact description.

Ordinarily the end gate for a freight wagon body is held in closed position by means of a transverse rod that is furnished with a head on one end, and is screw-threaded on the opposite end, the latter being screwed into a nut block that is secured on a sideboard of the wagon body.

In order to prevent the accidental removal of the securing rod or bolt, the threaded end thereof is screwed a distance through the nut, and may have a winged jam nut on said end.

In loading or unloading the freight wagon, it is frequently necessary that the end gate be removed; and the ordinary means for fastening the cross bolt requires considerable time for its release.

The purpose of this invention is to provide a securing device for the cross bolt that holds an end gate in place, which is novel, simple and practical, enabling the instant release of the threaded end of the cross bolt, for its removal, and also for quickly effecting an attachment of the nut that engages said end of the bolt.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a side view of the improved securing device mounted upon a side board for a wagon body; Fig. 2 is a rear edge view of the improved securing device, in position on a wagon body shown broken away between the side boards thereof; Fig. 3 is a transverse sectional view, substantially on the line 3—3 in Fig. 1; Fig. 4 is a transverse sectional view of novel details, substantially on the line 4—4 in Fig. 1; Fig. 5 is a detached perspective view of a link bar that is a detail of the invention; Fig. 6 is an enlarged transverse sectional view of a side board for a wagon body, and a like view of novel details, showing the half sections of the securing nut separated for a release of a cross bolt not shown; and Fig. 7 is a plan view of the device mounted upon a portion of a wagon body, and arranged for retaining an end gate thereof in place.

In the drawings, A indicates one side board of a wagon body; A', an opposite side board therefor, and 10 an end gate of usual form, that in service is disposed transversely between the side boards, and at its ends is engaged with the inner surfaces of said side boards.

A tie-rod 11 of the usual form, consisting of an elongated bolt, having a hand-hold $11^a$ on one end, and a screw thread $11^b$ formed upon the opposite end portion is adapted for engagement with perforations in lugs $a$ on the rear side of the end gate, or may have bearing contact therewith, as usual. The threaded end portion $11^b$ extends through a perforation in the side board A, for engagement with the improved securing device that is constructed as follows: 12 indicates a base plate adapted for attachment at a proper point on the outer side of the side board A, by means of screws $b$, said base plate being preferably disposed in an upright position on said side board. Upon the upper portion and outer side edges of the base plate 12, two similar undercut guide flanges 13, 13 are formed. Two blocks 14, $14^a$ are slidably inserted beneath the overhanging portions of the guide flanges 13, and in adjacent ends of each of said blocks a semicircular recess $c$ is formed in each, said recesses being opposite each other, form a circular opening when the blocks are caused to have contact endwise. The blocks 14, $14^a$ are threaded in the recesses $c$ and receive the threaded end $11^b$ of the tie-rod 11, when said rod is inserted through the base plate 12, they together forming a nut wherein the end portion $11^b$ of the tie-rod may be screwed by manipulation of the hand-hold $11^a$. On the end of the base plate 12 that is farthest from the guide flanges 13, and is shown as disposed below said flanges, a sector bar 15 is formed or secured, which extends laterally and curves edgewise upwardly, said sector having an outwardly projecting flange $15^a$ on its convex outer edge wherein notches $d$ are formed, as shown in Fig. 4. A lever 16, in the form of a substantially flat bar, that is bent edgewise at its upper end 16ª is pivoted at said end upon the lower nut block 14ª, and thence projects downward across the toothed flange 15ª, one side edge of the lever having a depending tooth e formed thereon, that may enter in the notch d and interlock therewith. A link bar 17 that is curved edgewise, and bifurcated at one end to afford two spaced flanges g g thereon, receives the curved upper portion 16ª of the lever 16 between said flanges, and said flanges are pivoted upon the lever, as indicated at h in Figs. 1 and 3. The flat upper end portion of the link bar 17 is lapped upon the nut block 14 and thereon pivoted, as shown at i, in Fig. 1.

In use, assuming that the end gate or tail board 10 is located transversely between the side boards A, A', and that the tie rod 11 is to be fully inserted through the side boards and base plate 12, for retention of the end gate in place, the lever 16 is then adjusted as shown by dotted lines in Fig. 1, which will spread the nut blocks 14, 14ª apart, and permit the free insertion of the threaded end 11ᵇ of the tie-rod between the threaded concavities in the adjacent ends of said nut blocks. The lever 16 is now rocked to the right, sliding over the flange 15ª, which will close the nut blocks 14, 14ª toward each other, and cause the side walls of the semicircular threaded recesses c in the ends of said nut blocks to closely embrace the threaded end portion of the tie rod, affording a completed nut, wherein the rod may be turned and draw upon the side boards A, A' if this is necessary. It will be noted that the two sections of the divided nut, will be held in closed adjustment by the latched engagement of the tooth e, in the notches d, and to insure such an engagement, a plate spring 18 is secured by one end on the base plate 12, and at its free end exerts pressure upon the lever 16. Obviously, at any time it is desired to release the tie rod 11 from the nut-blocks 14, 14ª, this can be quickly effected by lifting the lever 16 so as to disconnect the tooth e from the notches d and rocking said lever leftward as indicated by dotted lines in Fig. 1, which will spread the nut blocks apart, and release the rod.

Having thus described my invention, I claim as new, and desire to secure by Letters Patent,—

1. A securing device for an end gate, comprising a cross-bolt having a grip piece on one end, said bolt passing through the sides of a wagon body near a transverse end gate, a base plate secured on one side board, two undercut guide flanges on said base plate, two nut blocks slidably mounted on the base plate beneath the guide flanges, each nut block having a concaved end and threaded in said concavity, a rockable lever having a curved end pivoted at said end on one nut block, a link bar curved edgewise and pivoted at its ends respectively on the curved end of the lever and the other nut block, and means for detachably securing the lever when rocked for closure of the nut blocks.

2. A securing device for an end gate, comprising a cross bolt having a grip-piece on one end, and a thread on the opposite end, said bolt passing through the sides of a wagon body near a transverse end gate, a base plate secured on the side of the body through which the thread passes, two nut-blocks slidably mounted on the base plate near one end thereof, a sector bar extended laterally from the other end of the base plate, a notched flange on the sector bar, a lever laterally curved near one end and pivoted at said end on the nut block nearest thereto, an edge-curved link bar pivoted at its ends respectively on the lever at its curved portion and on the other nut block, said lever near its free end crossing the flanged sector bar, a tooth on said lever adapted to lock in notches in the flange of the sector bar, and a spring pressing upon the lever above the tooth thereon.

In testimony whereof I have subscribed my name to this specification in the presence of two subscribing witnesses.

LUDWIG HILLAN.

Witnesses:
J. R. MARTIN,
HENRY KING.